United States Patent [19]

Prentice

[11] Patent Number: 5,785,006
[45] Date of Patent: Jul. 28, 1998

[54] CATTLE CRUSH

[76] Inventor: John Prentice, The Hermitage, Castle Douglas DG7 3LG, United Kingdom

[21] Appl. No.: 640,836

[22] PCT Filed: Sep. 7, 1995

[86] PCT No.: PCT/GB95/02105

§ 371 Date: May 7, 1996

§ 102(e) Date: May 7, 1996

[87] PCT Pub. No.: WO96/07315

PCT Pub. Date: Mar. 14, 1996

[30] Foreign Application Priority Data

Sep. 7, 1994 [GB] United Kingdom ............ 9418001

[51] Int. Cl.[6] ............................................ A61D 3/00
[52] U.S. Cl. .................. 119/732; 119/723; 119/725
[58] Field of Search ........................ 119/723, 724, 119/725, 732, 737

[56] References Cited

U.S. PATENT DOCUMENTS

| | | | |
|---|---|---|---|
| 576,541 | 2/1897 | Brent et al. | 119/724 |
| 970,344 | 9/1910 | Mills | 119/723 |
| 3,026,846 | 3/1962 | Emmelkamp | 119/723 |
| 3,788,280 | 1/1974 | Van Gilst | 119/737 |
| 4,590,887 | 5/1986 | Holopainen | 119/723 |

FOREIGN PATENT DOCUMENTS

| | | | |
|---|---|---|---|
| 216699 | 1/1958 | Australia | 119/732 |
| 0104722 | 4/1984 | European Pat. Off. | |
| 857831 | 4/1961 | United Kingdom | |

OTHER PUBLICATIONS

"Cattle Crushes", Poldenvale Limited (Williton Somerset TA4 4RF) Royal Smithfied Show, Jan. 12, 1986.

*Primary Examiner*—Edgar S. Burr
*Assistant Examiner*—Amanda B. Sandusky
*Attorney, Agent, or Firm*—Ratner & Prestia

[57] ABSTRACT

A cattle crush for restraining ruminants has end faces and rear and forward side faces. A hinge is provided in the center of one end face for opening the cattle crush and means for restraining the head of the ruminant are provided in the other end face.

10 Claims, 4 Drawing Sheets

CATTLE CRUSH

CROSS REFERENCE TO RELATED APPLICATIONS

This application is a 371 of PCT/GB95/02105 filed Sep. 7, 1995.

This invention relates to a crush for restraining cattle or ruminants, referred to hereinafter for convenience simply as a cattle crush. The invention is particularly but not exclusively of use with calves.

Recent EC Regulations require farmers to log each calf for identification purposes which includes, inter alia, the farmer having to place ear tags with numbers on each calf. This logging should be done within the first two weeks of a calf's life and has hitherto been done by a number of farm workers setting out to catch the calf in the field and restraining it by hand. Other operations may also be done at this time such as dehorning or injecting the calf.

This method of performing this operation is time consuming and not very efficient due to the needless waste of manpower. The process may also be very stressful to the calf.

According to the present invention there is provided a cattle crush for restraining ruminants being portable and comprising rear and forward side faces, end faces, a hinged portion being provided to allow the cattle crush to be opened so that the ruminant enters the cattle crush and is disposed between said rear and forward side faces, one end face having a formation which allows the head of the ruminant to be disposed through said end face when the cattle crush is closed.

Preferably, said cattle crush is provided with support means to support the ruminant held within the cattle crush.

Preferably, the support means is one or more straps fixed to the cattle crush at one end of the strap(s) and positionable around the underside of the ruminant so that each strap is fixable to the cattle crush at the other end of the strap.

Preferably, said cattle crush is made from a metallic material. Alternatively, the cattle crush or a part of the cattle crush may be made from a moulding such as a fibre glass moulding.

Preferably, said forward side face is adapted so that the ruminant is accessible from the side. This may be achieved by the forward side face comprising a wall, the wall being lower than the height of the ruminant held within the cattle crush. Alternatively, the forward side face may comprise a bar or an arrangement of bars allowing side access to the ruminant.

Preferably, the rear side face is attachable to a vehicle. In this way the cattle crush is portable. Alternatively, the attachment of the cattle crush to the vehicle may be provided at at least one edge of the rear side face.

Preferably, the hinged portion is provided in one of the end faces of the cattle crush.

Preferably, the cattle crush is lockable when closed.

An embodiment of the invention will now be described by way of example with reference to the accompanying drawings in which.

Figure 1:
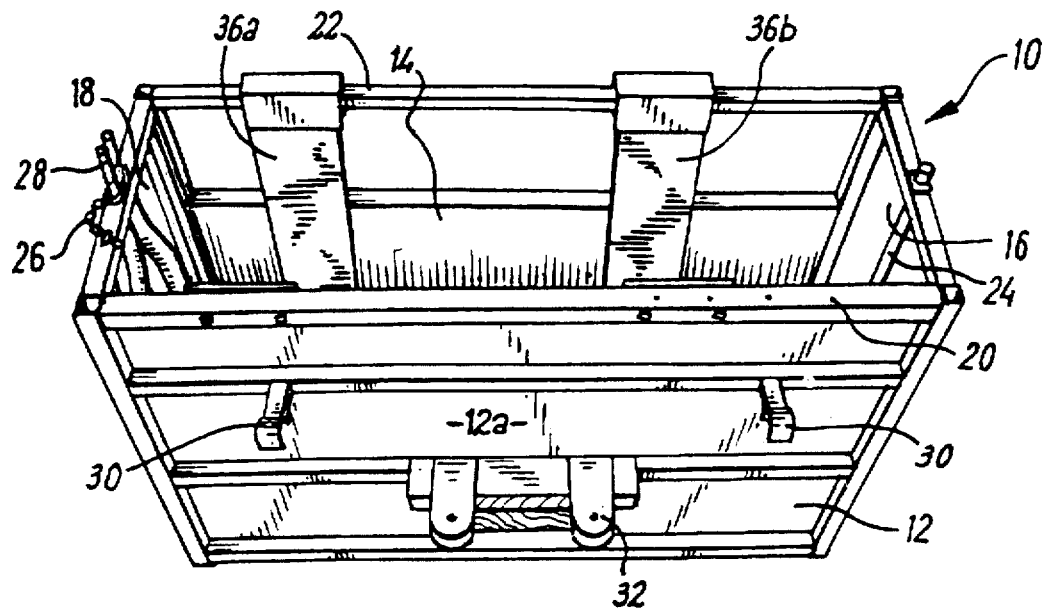
FIG. 1 is a view from above of a closed cattle crush.
Figure 2:
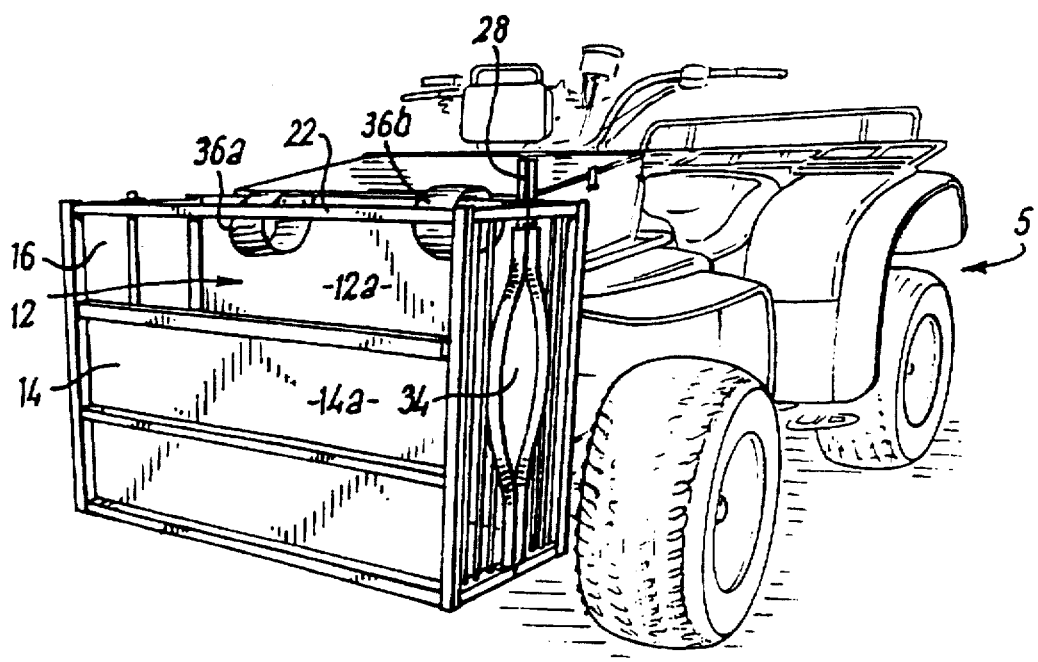
FIG. 2 is a view of the cattle crush shown in FIG. 1 fixed to the front of an ATV.

With reference to the drawings there is provided a cattle crush 10 having a welded steel frame defining rear and forward side faces 12 and 14 respectively and end faces 16 and 18. The cattle crush 10 is of a size suitable for use with young calves and therefore is fixable to the front of an ATV, referred to as vehicle 5, (see FIG. 2) to enable the cattle crush 10 to be portable and easily manoeuvred into position for restraining a calf by a driver of the vehicle 5.

Figure 5:
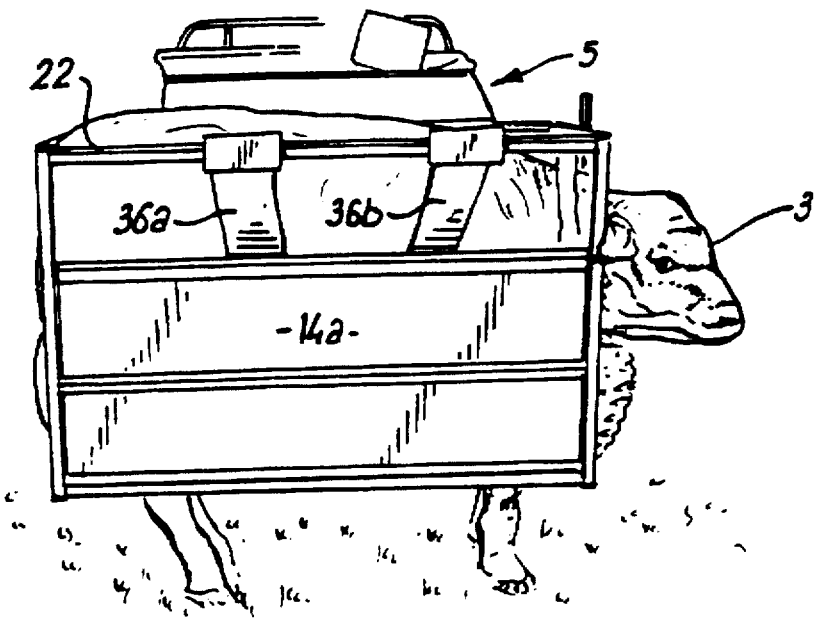
FIG. 5 is the cattle crush having a calf restrained therein.

The rear and forward side faces 12 and 14 comprise steel sheets 12a and 14a respectively, the sheet 14a not extending to the full height of the forward side face 14 to allow side access to a calf 3 held within the cattle crush 10 (See FIG. 5). Support means are provided in the form of straps 36a and 36b which are fixed on an edge 20 of the rear side face 12 and engage an upper edge 22 of the forward side face 14.

Figure 3:
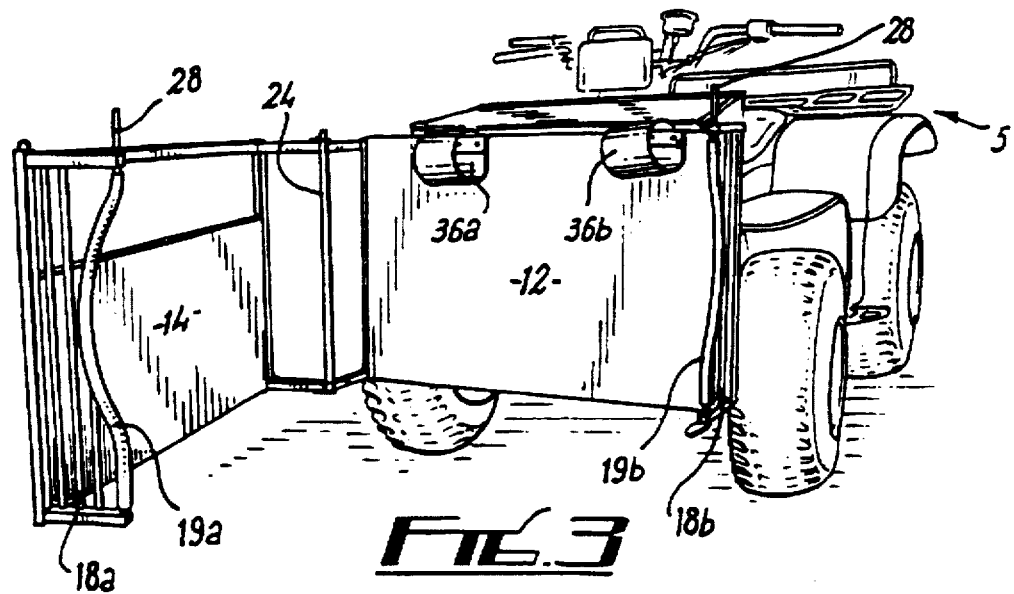
FIG. 3 is a view of the cattle crush of FIG. 2 opened.
Figure 4:
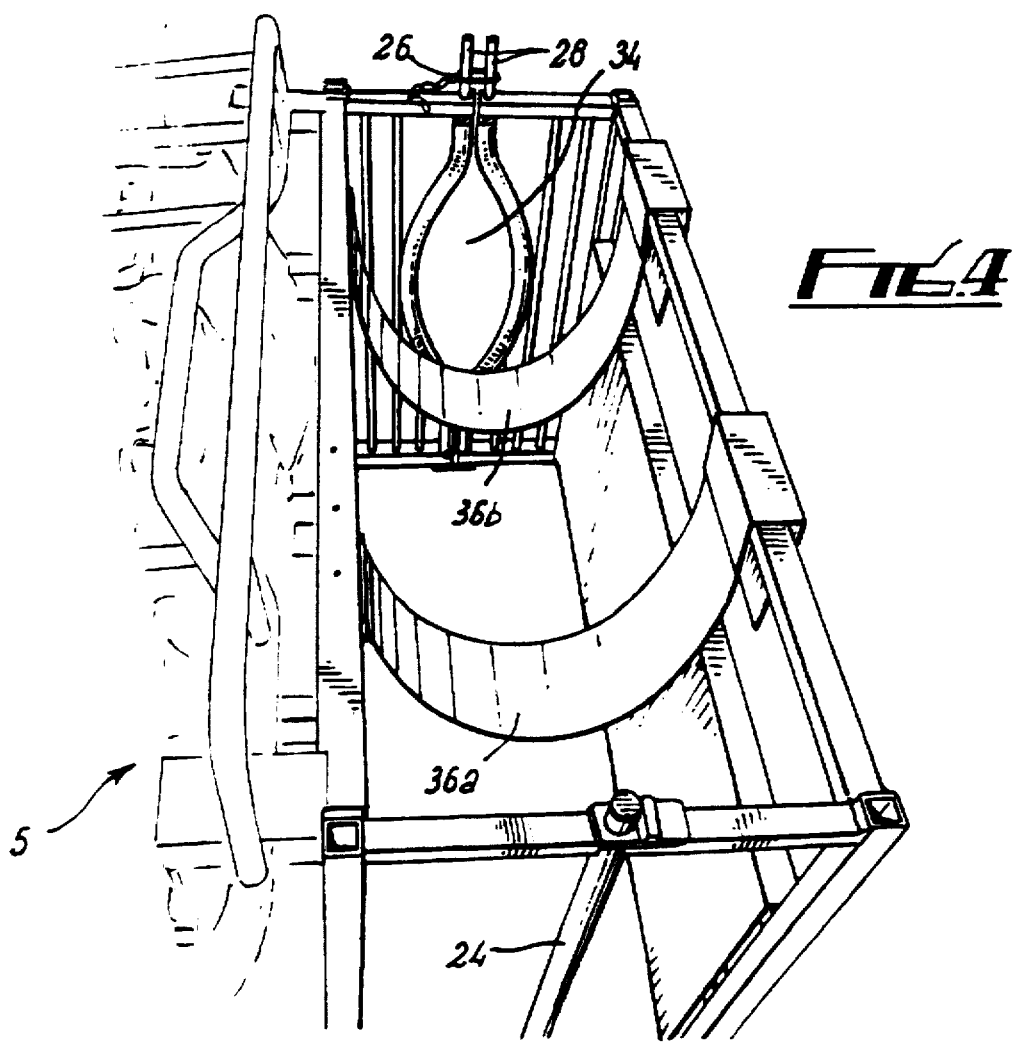
FIG. 4 is a view from above of the cattle crush of FIG. 2 showing the support means.

Part of the end face 16 is hinged around a bar 24 to allow the cattle crush 10 to be opened at the end face 18 as shown in FIG. 3. The cattle crush 10 is locked in a closed position by a chain 26 being placed around a pair of formations 28 on an upper edge of the end face 18. The end face 18 is in two parts 18a and 18b. An inner edge 19a and 19b of the end face 18a and 18b respectively has arcuate formations which form an opening 34 when the cattle crush 10 is closed.

The cattle crush 10 is fixed to the vehicle 5 (see FIG. 2) by hook formations 30 and fixing means 32 at the rear side face 12. When the cattle crush 10 is fixed to the vehicle 5 the chain 26 may be removed from one of the formations 28 to allow the forward side face 14 and the part 18a of the end face 18 to pivot around the bar 24 thereby opening the cattle crush.

Figure 6:
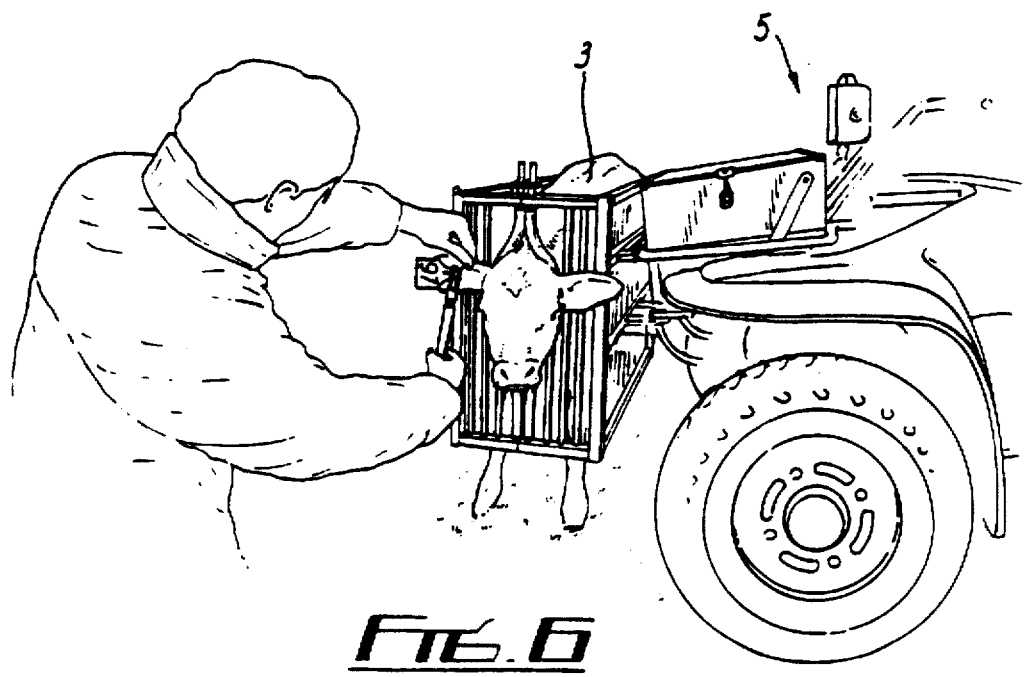
FIG. 6 is an end view of the cattle crush showing the tagging of the calf.
Figure 7:
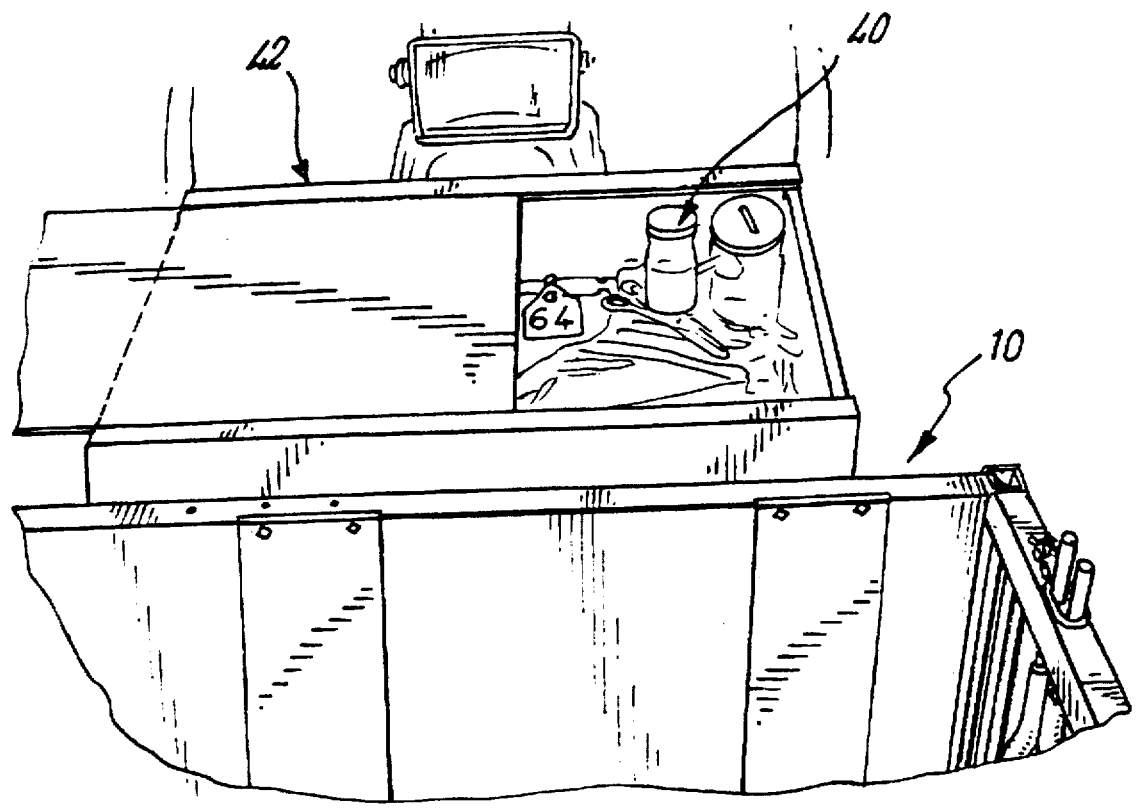
FIG. 7 is a view from above of the cattle crush fixed to the ATV vehicle showing a box with equipment used on the restrained calves.

In use the cattle crush 10 is opened as shown in FIG. 3 and a calf 3 is lured between the side faces 14 and 12 and the cattle crush 10 is closed with the calf's head protruding through the opening 34 (see FIG. 5). The free ends of the straps 36a and 36b are passed beneath the underside of the calf 3 and are attached to the edge 22 of the forward side face 14 and are adjustable to provide adequate support for the calf 3 within the cattle crush 10 such that a substantial proportion of the calf's weight is supported by the straps whilst the calf's hooves remain in contact with the ground. In this position various operations may be carried out which are necessary for the identification of the calf 3 in accordance with EC Regulations. For example, as shown in FIG. 6 the calf 3 may be tagged and FIG. 7 shows the various equipment 40 needed for such operations within a box 42 placed on the vehicle 5.

Since the cattle crush 10 is fixed to the vehicle 5 it is portable and provides easy use by a farmer on the farm and can be manoeuvred in a manner that urges the calf 3 into the cattle crush 10. This has the advantage that the restraining and identifying of the calf 3 can be carried out by a single person and the portability of the cattle crush 10 allows the farmer to be able to approach any calf in situ easily and quickly. Thus the cattle crush 10 saves time and provides a reduction in the number of people required to restrain calves for this identification process or other operation.

Improvements and modifications may be incorporated without departing from the scope of the invention.

I claim:

1. A cattle crush for restraining ruminants being portable and comprising rear and forward side faces and first and second end faces, a hinge being provided in said first end face to allow the cattle crush to be opened so that a ruminant enters the cattle crush and is disposed between said rear and forward side faces, said second end face comprising a first part rigidly connected to said rear side face and a second part rigidly connected to said forward side face, whereby said first and second parts have respective arcuate inner edges which form sides of an opening in said second end face when the cattle crush is closed, said opening being adapted to restrain a head of a ruminant.

2. A cattle crush as claimed in claim 1 provided with support means to support a ruminant held within the cattle crush.

3. A cattle crush as claimed in claim 2, wherein the support means is one or more straps fixed to the cattle crush at one end of the strap(s) and positionable around the underside of a ruminant so that each strap is fixable to the cattle crush at the other end of the strap.

4. A cattle crush as claimed in claim 1 made from a metallic material.

5. A cattle crush as claimed in claim 1, wherein said side faces and said end faces are made from a moulding.

6. A cattle crush as claimed in claim 1, wherein said forward side face is adapted so that a ruminant is accessible from the side.

7. A cattle crush as claimed in claim 1, wherein said rear side face is attachable to a vehicle.

8. A cattle crush as claimed in claim 1, having an attachment of the cattle crush to a vehicle at at least one edge of said rear side face.

9. A cattle crush as claimed in claim 1, wherein said hinge is provided at the centre of the first end face.

10. A cattle crush as claimed in claim 1, wherein the cattle crush is lockable when closed.

* * * * *